United States Patent Office 3,810,875
Patented May 14, 1974

3,810,875
FLUORINE-CONTAINING BLOCK COPOLYMERS
David E. Rice, Woodbury, and Robert L. Hansen, Roseville, Minn. (both 3M Center, St. Paul, Minn. 55101)
No Drawing. Continuation-in-part of abandoned application Ser. No. 70,541, Sept. 8, 1970. This application Aug. 2, 1971, Ser. No. 168,373
Int. Cl. C08f 29/14, 29/16
U.S. Cl. 260—899
18 Claims

ABSTRACT OF THE DISCLOSURE

Poly(perfluoroalkylene oxide) polyperoxides, such as the diacyl peroxide of poly(perfluoroalkylene oxide), are used to initiate the free radical polymerization of ethylenically-unsaturated monomers to produce block copolymers comprising alternating poly(perfluoroalkylene oxide) blocks and polyalkylene blocks. These block copolymers, as such or as cross-linked, have very good low temperature flexibility, i.e., low glass transition temperatures, which makes them very useful for gaskets, O-rings, sealants, and other shaped articles which can be used even in cryogenic environs.

---

This application is a continuation in part of our copending application Ser. No. 70,541, filed Sept. 8, 1970, now abandoned.

This invention relates to fluorine-containing block copolymers and to their preparation.

Several known fluorocarbon polymers containing ether linkages in the backbone exhibit desirable properties such as thermal and oxidative stability and solvent resistance. However, it is difficult to prepare fluorocarbon ether polymers in very high molecular weights, and furthermore, the fluorocarbon ether backbone does not provide reactive sites available for crosslinking to provide cured high molecular weight polymers. For these reasons, fluorocarbon ether polymers have heretofore generally been limited to applications such as lubricants, sealants and binders where low molecular weight materials can be used.

The present invention provides novel block copolymers which have poly(perfluoroalkylene oxide) blocks (hereinafter "A" blocks) and blocks (hereinafter "B" blocks) derived from terminally ethylenically-unsaturated polymerizable comonomers. These copolymers have good low temperature flexibility with at least one glass transition temperature below about −78° C. The copolymers can be prepared with molecular weights ranging from very low to very high levels. The copolymers usually can also be cross-linked.

In general, the block copolymers can be of the types such as A–B, A–B–A, B–A–B, and A–B–A–B. A preferred class of the block copolymers has the following backbone structure:

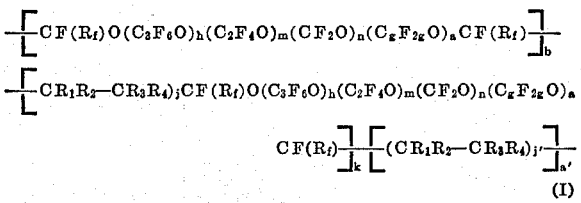

(I)

where $R_1$ and $R_2$ are hydrogen or fluorine, $R_3$ is fluorine, hydrogen, lower alkyl, aryl, or lower perfluoroalkyl, $R_4$ is fluorine, chlorine, lower alkyl, aryl, acyloxy, carbo-alkoxy, lower alkoxy, vinyl, cyano, lower perfluoroalkyl, or lower perfluoroalkoxy, $R_f$ is fluorine or perfluoromethyl, $a$, $a'$ and $b$ are zero or one, $j$ and $j'$ are integers of at least 5, $k$ is at least 1, and $g$ is an integer of at least 4. The subscripts $h$, $m$ and $n$ are zero or integers from 1 to 200, preferably 10 to 50, no more than two of said subscripts being zero simultaneously and either or both of $n$ and $m$ being greater than zero in order for the poly (perfluoroalkylene oxide) block of said copolymer to have a glass transition temperature below −78° C. The backbone structure of the block copolymer is terminated by adventitious terminating end-groups such as hydrogen atoms, carboxyl radicals, or by any other mono-functional radical abstracted from its surroundings as a chain-terminating or chain-transfer, instead of a chain-extending, reaction.

The block copolymers comprising the backbone structure of Formula I are comprised of polyalkylene segments ("B" blocks) of the formula

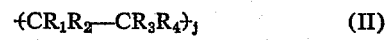
(II)

and poly(perfluoroalkylene oxide) segments ("A" blocks) of the formula

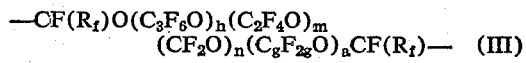
(III)

Preferably, $R_1$ and $R_2$ are hydrogen or fluorine, $R_3$ is fluorine or lower perfluoroalkyl, and $R_4$ is fluorine, chlorine, or lower perfluoroalkyl. The Formula III segment preferably has a number average molecular weight, $\overline{M}n$, of 500 to 10,000.

The Formula II segment can be derived from any polymerizable terminally ethylenically-unsaturated compound, polymerizable or copolymerizable in the presence of free radicals, such compounds being preferably fluorinated olefins having 2 or 3 carbon atoms and containing no more than two hydrogen atoms, for example, vinylidene fluoride, tetrafluoroethylene, perfluoropropene, trifluoroethylene, pentafluoropropene, and chlorotrifluoroethylene. Other useful compounds include vinyl fluoride, vinyl chloride, dichlorodifluoroethylene, hexafluorobutadiene, partially or completely fluorinated or non-fluorinated butadienes, isoprenes, styrenes, acrylic and methacrylic esters, acrylonitriles, vinyl esters, vinyl ethers, and vinyl amines. Mixture of two or more of said ethylenically unsaturated compounds can be used. The Formula II segment can also be derived from copolymers of said compounds, such as a copolymer of vinylidene fluoride and perfluoropropene (e.g., vinylidene fluoride/ perfluoropropene in the mole ratio varying from 95/5 to 50/50).

A particularly preferred Formula II segment (or "B" block) is one which in itself corresponds in structure to a fluoroelastomer and, as a "B" block, imparts elastomeric properties to the block copolymer. In such segments, at least 10 percent of the catenary carbon atoms are substituted only by hydrogen, at least 10 percent are substituted by a fluorine atom and a perfluoroalkyl or a perfluoroalkoxy radical, and at least 50 percent are substituted only by fluorine, a perfluoroalkyl or a perfluoroalkoxy radical (e.g. a copolymeric segment of $CF_3CF=CF_2$ and $CF_2=CH_2$).

Another class of elastomeric block copolymers of this invention is one wherein the Formula II segment is sufficiently regular and rigid to form crystallite regions which are connected by amorphous poly(perfluoroalkylene oxide) regions.

Generally, for each block copolymer of Formula I, the sum of the weight of the Formula II segments divided by the sum of the weights of the Formula III segments can vary from 1/100 to 100/1, preferably 1/10 to 10/1.

3

Preferred block copolymers of the invention have the backbone structure of the formula

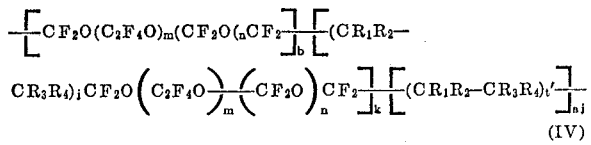
(IV)

where $R_1$ and $R_2$ are hydrogen or fluorine, $R_3$ is fluorine or perfluoromethyl, $R_4$ is fluorine, chlorine or perfluoromethyl, $a'$ and $b$ are zero or 1, $j$ and $j'$ are at least 5, $k$ is an integer of at least 1, and the subscripts $m$ and $n$ form a ratio $m/n$ which is 0.2/1 to 5/1, preferably 0.5/1 to 2/1.

At least one glass transition temperature, $T_g$, of the block copolymers of Formula I and Formula IV is in general lower than $-78°$ C. and preferably lower than $-100°$ C., and can be as low as $-125°$ C. or even lower, e.g. $-130°$ C. The advantageously low glass transition temperatures of the block copolymers are further lowered by increasing the oxygen/fluorine ratio in the copolymer. The "glass transition temperature" of a polymer is that temperature range above which a polymer is soft or rubbery, that is, flexible, and below which it is a hard and brittle glass; such temperature is generally determined by differential thermal analysis (DTA), by changes in coefficient of expansion, or measurement of similar physical properties.

The block copolymers are generally prepared by the polymerization of the ethylenically unsaturated compound(s) in the presence of a poly(perfluoroether) polyperoxide(s). For example, the block copolymers of Formula I and Formula IV can be conveniently prepared by first contacting a diacyl chloride-terminated poly(perfluoroalkylene oxide) of the formula

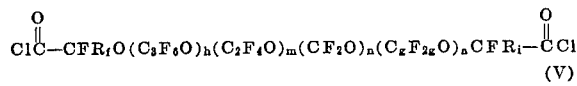
(V)

with sodium peroxide to produce a diacyl peroxide of the formula

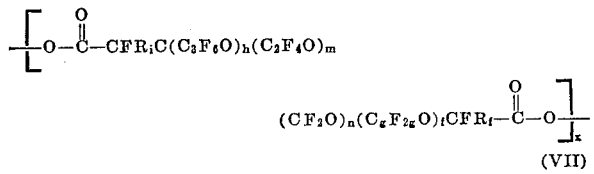
(VII)

(wherein $x$ is an integer corresponding to the degree of polymerization) or the equivalent diacyl hydroperoxide. The diacyl peroxide of Formula VI may then decompose to form di-radicals of the formula

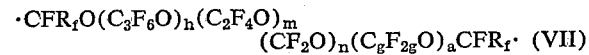

The di-radicals of Formula VII will initiate the polymerization of olefins of the formula $R_1R_2C=CR_3R_4$ to form the block copolymers of Formulas I and IV, whereby the di-radical of Formula VII becomes incorporated into the polymer. To prepare the diacyl chloride-terminated poly (perfluoroalkylene oxides) of Formula V, it is desirable and convenient to use as starting material the carboxyl-terminated compound of the formula

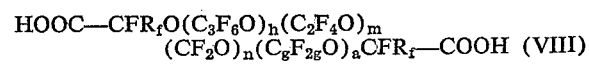
(VIII)

which can be prepared according to the methods shown in Italian Pat. No. 817,809 or U.S. Pat. No. 3,250,807.

The formation of the block copolymers can be carried out by simply mixing the appropriate diacyl chloride-terminated poly(perfluoroalkylene oxides) of Formula V with sodium peroxide and the desired olefin. However, more homogeneous products can be obtained in higher yield and at faster polymerization rates by using a two-step process. Thus, it is preferred to first prepare the diacyl peroxide of Formula VI and then contact the olefin with the diacyl peroxide. More specifically, the diacyl peroxide of Formula VI is prepared by contacting a solution of the diacyl chloride-terminated poly(perfluoroalkylene oxide) of Formula V with aqueous sodium peroxide at a temperature between $-5°$ C. to about 15° C. Temperatures lower than $-5°$ C. may cause the aqueous phase to freeze while temperatures above 15° C. will generally result in lower yields of the diacyl peroxide. The solvent which contains the diacyl chloride-terminated poly(perfluoroalkylene oxide) is a solvent which will dissolve both the compound of Formula V and the compound of Formula VI. For example, the solvent can be a halogenated solvent such as cyclo-$C_8F_{16}O$, $C_8F_{18}$, $(C_4F_9)_3N$, $CF_2ClCFCl_2$, $CCl_3CH_3$, $(CF_3)_2C_6H_4$, $C_6F_6$, and the like.

The optimum reaction time for preparation of the diacyl peroxide of Formula VI is of the order of 5–10 minutes with vigorous agitation of the solution. Reaction times longer than 10 minutes may result in lower yields of Formula VI compounds because of concurrent peroxide decomposition. At the end of the reaction period, the reaction mixture is treated with a small amount of acid, e.g., sulfuric acid, to render the diacyl peroxide solution more stable.

The Formula VI compounds can be isolated, if desired, by evaporating the solvent at a temperature, e.g., room temperature, which does not cause excessive decomposition of the peroxide. However, instead of isolating the Formula VI compounds it is more preferred and more convenient to use them in solution form for the subsequent step where they are used to initiate polymerization of the olefin. The polymerization solution may be obtained by dilution of the first solution in a solvent more compatible with the olefin.

The aqueous sodium peroxide solution used to convert the Formula V compounds to the Formula VI compounds may be formed by dissolving sodium peroxide in water. More conveniently, the aqueous sodium peroxide solution may be generated in situ from aqueous solutions of hydrogen peroxide and sodium hydroxide. While sodium peroxide solutions are preferred for the conversion of Formula V compounds to Formula VI compounds, other alkali metal and alkaline earth metal peroxides, such as potassium peroxide and barium peroxide, may also be used.

The reaction of the Formula VI compounds with olefins to form the block copolymers of the invention is carried out by charging the olefin and the solution comprising the diacyl peroxide of Formula VI and the solvent into a suitable reactor such as a glass ampoule or a glass-lined or stainless steel autoclave. The contents of the reactor are then agitated until the reaction is complete. Usually the reaction requires several hours. Stirring is not necessary but it does aid in controlling the reaction temperature and in providing a more homogeneous product. When the olefins are gaseous materials at room temperature, the reaction is usually performed at superatmospheric pressure.

The temperature at which the reaction proceeds to form the block copolymer may vary considerably. Generally the temperature should be higher than the melting point of the solvent but not higher than 150° C. The use of the lower reaction temperatures results in a more uniform and homogeneous block copolymer but requires longer reaction times. The use of the higher temperatures results in faster reactions (shorter reaction times) but lower molecular weight block copolymers are produced. A preferred temperature for the reaction is one in the range of 0° to 50° C.

Another alternative procedure for preparing the block copolymers of this invention involves the use of a poly (perfluoroalkylene oxide) having peroxidic linkages, viz. polyether polyperoxides, such as are disclosed, for example, in U.S. Pat. 3,442,942, Canadian Pat. 810,750, British Pat. 1,217,871, and Italian Pat. 817,809. These polyether polyperoxides preferably have the formula $$Y—O—(C_3F_6O)_h(C_2F_4O)_m(CF_2O)_n—(O)_p—Y \quad (IX)$$

where $h$, $m$, and $n$ are as described above, $p$ is an integer less than the sum of $h+m+n$, the ratio of $(p/(h+m+n)$ preferably being less than 0.5, and Y is a radical such as —$CF_3$, —COF, —$CF_2$COF, —$CF(CF_3)$COF, and others disclosed in the above four patents. The block copolymers of this invention can be prepared by dissolving the polyether polyperoxide in an inert solvent, such as a chlorinated hydrocarbon, a chloro-fluorocarbon, or a fluorocarbon, adding to the resulting solution at least one of the above-described free-radical polymerizable terminally ethylenically unsaturated compounds, if necessary under pressure, and breaking peroxidic linkages in the polyether polyperoxide by means of heat, or, preferably, ultra-violet light of a wave length lower than 3,300 angstroms. The resulting block copolymer can then be recovered by evaporating the solvent from the reaction product and converting into shaped articles, for example, by casting, molding, or extrusion.

The properties of the block copolymers will be dependent upon the relative weight amounts of olefin segments (Formula II) and the poly(perfluoroalkyleneoxide) segments (Formula III). The relative amount of poly(perfluoroalkylene oxide) moiety in the block copolymer can be controlled by the relative ratio of olefin to poly(perfluoroether) polyperoxide and the reactivity of the olefin or olefin mixture, toward free radical polymerization; the higher the ratio and the higher the reactivity of the olefin monomer, the lower the concentration of poly(perfluoroalkylene oxide) in the resulting block copolymer. Since reaction conditions are frequently controlled so that a significant portion of the olefin remains unreacted at the end of the reaction period, an excess of olefin over that desired in the final polymer is usually used. At least 5 percent by weight of poly(perfluoroalkylene oxide) moiety is necessary to provide a significant improvement in low temperature characteristics over the poly(perfluoroalkylene oxide)-free homopolymer or copolymer; preferably at least 10 percent and usually 25 percent or more of the poly(perfluoroalkylene oxide) is required to obtain good low temperature characteristics. Resistance to ordinary solvents usually requires at least 40 percent of fluorine by weight in the block copolymer product.

While the olefin block may comprise as much as 95 percent of the block copolymer, as little as one percent may produce a very useful copolymer. Under practical conditions, the poly(perfluoroalkylene oxide) block derived from the poly(perfluoroether) polyperoxides has a molecular weight of less than 20,000, generally less than 10,000, and usually from 500 to 4,000. By means of a relatively low molar proportion of polymerizable monomer, one, or a few, monomer units can serve as chain extending units, to produce essentially a poly(perfluoroalkylene oxide) having a molecular weight of a few hundred thousand up to one million or even more. When only a relatively small amount of Formula III segments are in the block copolymer, the physical properties of the block copolymer will be similar to those of the corresponding olefin polymer, except for the lower $T_g$. When the total weight of Formula III segments in the block copolymer is 10% or more of the total weight of Formula II segments, the block copolymer has very good low temperature flexibility in addition to having improved thermal stability and solvent resistance.

The block copolymers of the invention, and their preparation, are further illustrated in the following examples.

EXAMPLE I

A mixture of 50 grams of the compound of Formula VIII (molecular weight ca. 2000, $m./n=0.7$, $h$ and $a$ are zero), 250 cc. of $CF_2ClCFCl_2$, and 17 grams of phosphorus pentachloride was charged to a 500 ml. glass reaction vessel and stirred, with reflux, for 20 hours. The solvent was removed under vacuum at 50–60° C. after which 250 cc. of $C_5F_{11}NO$ (sold under the trademark "FC–78") were added to extract the compound of Formula V from the excess of phosphorus pentachloride. The solution comprising the compound of Formula V and the solvent is then centrifuged and the solvent is removed under vacuum. The Formula V compound was obtained in the amount of 48 grams.

EXAMPLE II

A 100 cc. 3-neck glass flask which was equipped with a mechanical stirrer, thermometer and addition tube, was charged with 40 cc. of cyclo-$C_8F_{16}O$ (sold under the trademark "FC–75") and then cooled to 0° C. Sodium hydroxide solution (0.8 cc. of a solution prepared by dissolving 4 grams of NaOH in 10 cc. of water) and 0.5 cc. of 30% hydrogen peroxide were then added to the cooled flask followed by rapid stirring for 10 min. Then 8 grams of the Formula V compound prepared in Example I was added to the flask followed by rapid stirring for 5 min. Concentrated sulfuric acid (1.5 cc.) was added to the flask and the temperature of the flask contents was allowed to rise to 10–15° C. over a period of 10 min. Water (2 cc.) was then added and stirring was continued for an additional 3 min. The reaction mixture was then centrifuged to yield solution of the diacyl peroxide of Formula VI. Infrared spectra confirmed the indicated structure.

EXAMPLE III

A 30 cc. glass ampoule was cooled in liquid nitrogen and charged with 0.3 gram of sodium peroxide, 5 grams of the Formula V compound prepared in Example I, 20 grams of perfluoropropene and 1.5 grams of vinylidene fluoride. The ampoule was sealed under vacuum and shaken at room temperature for 24 hours. The ampoule was then opened and allowed to vent, after which the remaining contents were washed with water and dried vacuum. Both a solid and a liquid were obtained. The liquid was unreacted Formula V compound and Formula VII compound and the solid was a block copolymer of Formula I, where the "B" block is a copolymer of vinylidene fluoride/perfluoropropane.

EXAMPLE IV

Twenty milliliters of a 20% w./v. solution of the Formula VI compound prepared in Example II in "FC–75" was charged to a 30 cc. glass ampoule and then 4.2 grams each of vinyliene fluoride and perfluoropropene were condensed into the ampoule. The ampoule was then sealed under vacuum and shaken at room temperature for 16 hours. The ampoule was then opened and the contents were dried under vacuum to yield a block copolymer of Formula I, where the "B" block is a copolymer of vinylidene fluoride/perfluoropropene. The inherent viscosity of the block copolymer was 0.44, as measured in 0.5% solution in acetone. Differential thermal analysis showed that the glass transition temperature of the block copolymer was —132° C. Similar analysis of a copolymer comprising only vinylidene fluoroide and perfluoropropene showed a glass transition temperature of —25° C.

A portion of the polymer was solvent cast from methyl ethyl ketone into a sheet of 1–1.25 mm. thickness. This sheet was cooled to —78° C. and quickly folded double without breaking. A specimen prepared from a copolymer of vinylidene fluoride/heaxfluoropropene of similar olefin ratio broke when subjected to the same test. Other portions of the film were immersed in xylene hexafluoride and methanol. No changes were noted in the appearance of the samples after three months immersion at room temperature. Samples of a commercial copolymer of 75/25 mole ratio vinylidene fluoride/hexafluoropropene were subjected to similar immersions. These samples swelled to 3–4 times their original volume within 16 hours.

The above procedure was repeated to make another block copolymer, except that the precursor Formula VIII compound used had a molecular weight of about 8000. The block copolymer showed a higher viscosity and similar glass transition temperature.

EXAMPLE V

Twenty milliliters of a 20% weight per volume solution of the Formula VI compound prepared in Example II in cyclo-$C_8F_{16}O$ was reacted with 4.8 grams $CF_2=CFCl$ according to the procedure of Example IV. The resulting block copolymer product (where the "B" block is a trifluorochloroethylene homopolymer) was a white powder insoluble in all common solvents but which could be pressed to a clear plastic film at temperatures above 300° F.

EXAMPLE VI

Example V was repeated using 4.2 grams $CF_2=CH_2$ in place of the $CF_2=CFCl$. The block copolymer product (where the "B" block is a vinylidene fluoride homopolymer), which weighed 8.0 g. was a white powder having an inherent viscosity in acetone at 0.5% concentration of 1.1. The polymer could be solvent cast or pressed into a clear strong film.

EXAMPLE VII

Twenty-five milliliters of the Formula VI compound prepared in Example II in $CF_2ClCFCl_2$ was stirred at reflux in a glass flask with 5.0 grams butyl acrylate for 24 hours. Evaporation of the solvent gave a tacky gum having an inherent viscosity in acetone of 0.28 at 1% concentration. The block copolymer was shown to contain both perfluoroether segments and poly(butyl acrylate) segments by infrared analysis. Films useful as low-temperature gaskets could be cast from acetone solutions.

EXAMPLE VIII

A solution of 1.0 g. of a polyether polyperoxide of Formula IX (with an inherent viscosity, IV, of 0.20, percent active oxygen of 1.5, $h=$zero and $m/n$ ratio of about 2) in 12 cc. "FC-75" was charged to a 30 ml. glass ampoule and 1.5 g. $CF_2=CH_2$ and 3.5 g. $C_3F_6$ added. The ampoule was sealed under vacuum and heated at 100–105° C. for 7 days. The reaction mixture was then air dried for 4 hrs. at room temperature and then for 3 hrs. at 70° C. at 1 mm. Hg to yield 4.0 g. of an elastomeric block copolymer film, the "B" block of the polymer being a vinylidene fluoride/perfluoropropene copolymer. (Analysis of this product for peroxide content indicated that about 90% of the original peroxide groups were still present—if the reaction mixture had been heated to higher temperatures or for a longer period of time, the peroxide content would have been zero.) DTA analysis showed two glass transition temperatures, at −105° C. and −25° C. The polymer was separated into two fractions of equal weight by extraction with acetone. The acetone soluble portion was found to have an inherent viscosity in acetone at 0.5% concentration of 0.71. The acetone insoluble fraction, which was soluble in fluorocarbons, had an inherent viscosity in xylene hexafluoride at 0.5% concentration of 0.42.

EXAMPLE IX

A 30 ml. quartz ampoule was charged with 1.45 g. of the polyperoxide described in Example VIII in 15 cc. "FC-75," 1.5 g. of $CF_2=CH_2$ and 3.5 g. $C_3F_6$. After sealing, the ampoule was attached to a low pressure mercury lamp (Hanovia No. 683A1, 3 watts at 2537 A.) and irradiated 3 days at about 35° C. The block copolymer product, after drying, consisted of 4.4 g. of a rubbery film. (Analysis indicated no residual peroxide.) The block copolymer was completely soluble in acetone (IV=0.66). DTA analysis indicated two $T_g$ values at −115° and −32°. The presence of 25–30% poly(perfluoroalkylene oxide) structure was established by nuclear magnetic resonance (NMR) analysis.

Extraction of the polymer with "FC-75" showed that 30% of the polymer was soluble in both acetone and fluorocarbon solvents. This fraction had an inherent viscosity in xylene hexafluoride at 1 wt. percent concentration of 0.10.

EXAMPLE X

Example IX was repeated except 2.9 g. of the polyether polyperoxide were used. The yield of block copolymer product was 5.7 g. About 50 wt. percent of the polymer was poly(perfluoroalkylene oxide) blocks. Approximately 50 wt. percent of this polymer was soluble in "FC-75" (IV=0.10); the remainder was soluble in acetone (IV=0.54). Both fractions contained both $CF_2=CH_2/C_3F_6$ copolymeric segments and poly(perfluoroalkylene oxide) segments as determined by infrared and NMR analysis.

EXAMPLE XI

A quartz ampoule was charged with 1.4 g. of a polyether polyperoxide of Formula IX (IV=0.44; percent active oxygen=3.7, $m/n=2$, $h=0$) in 15 cc. "FC-75," 1.5 g. $CF_2=CH_2$ and 3.5 g. $C_3F_6$. The ampoule was irradiated as in Example IX. The yield of elastomeric block copolymer product was 4.4 g. (no residual peroxide). About 35 wt. percent of this product was soluble in both acetone and fluorocarbon solvents (IV=0.15). The remaining 65 wt. percent was soluble in acetone (IV=0.45).

Various other block copolymers have been prepared, all of which come within the structure of Formula I, using various olefins and various diacyl peroxides of Formula VI. All of the block copolymers prepared have very low glass transition temperatures and good low temperature flexibility. All of the block copolymers can be formed into films and molded shapes which are then useful as gaskets, seals, O-rings, and other shaped articles which can be used even in cryogenic environs.

Various alterations and modifications of this invention will become apparent to those skilled in the art without departing from the scope and spirit of this invention.

What is claimed is:

1. A block copolymer comprising at least one block derived from at least one free radical polymerizable fluorinated olefin having 2 or 3 carbon atoms and containing not more than 2 hydrogen atoms and at least one block comprising poly(perfluoroalkylene oxide), said copolymer having at least one glass transition temperature below −78° C.

2. The block copolymer according to claim 1 wherein said block derived from said fluorinated olefin is a vinylidene fluoride/perfluoropropene copolymer having a mole ratio of 95/5 to 50/50.

3. A block copolymer comprising the structure of the formula

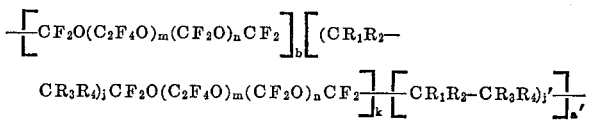

where $R_1$ and $R_2$ are hydrogen or fluorine, $R_3$ is fluorine or lower perfluoroalkyl, $R_4$ is fluorine, chlorine or lower perfluoroalkyl, $a'$ and $b$ are zero or 1, $j$ and $j'$ are integers of at least 5, $k$ is at least 1, and the subscripts $m$ and $n$ form a ratio $m/n$ which is 0.2/1 to 5/1.

4. The block copolymer according to claim 3 wherein $(CR_1R_2—CR_3R_4)_j$ and $(R_1R_2—CR_3R_4)_{j'}$ are vinylidene fluoride/perfluoropropene copolymers having a mole ratio of 95/5 to 50/50, said block copolymer containing at least 5 weight percent of the moiety

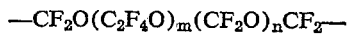

said block copolymer containing at least 40 weight percent fluorine and having at least one glass transition temperature below —78° C.

5. The elastomeric, block copolymer comprising at least one block derived from at least one free radical polymerizable fluorinated olefin having 2 or 3 carbon atoms and containing not more than 2 hydrogen atoms and at least one poly(perfluoroalkylene oxide) block having a plurality of —CF$_2$O—, —C$_2$F$_4$O—, or —C$_3$F$_6$O—, or mixtures thereof, said poly(perfluoroalkylene oxide) blocks being at least 10 weight percent of said copolymer, said copolymer having at least 40 weight percent fluorine and at least one glass transition temperature below —78° C.

6. The block copolymer of claim 5 wherein said block derived from said fluorinated olefin is a vinylidene fluoride/perfluoropropene copolymer having a mole ratio of 95/5 to 50/50.

7. A block copolymer comprising the structure of the formula

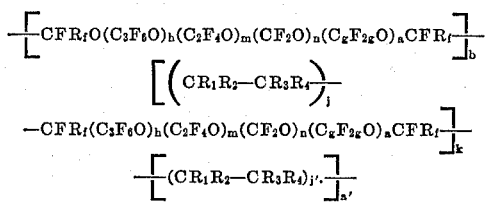

where R$_1$ and R$_2$ are hydrogen or fluorine, R$_3$ is fluorine or lower perfluoroalkyl, R$_4$ is fluorine, chlorine or lower perfluoroalkyl, $a$, $a'$, and $b$ are zero or one, $j$ and $j'$ are integers of at least 5, $k$ is an integer of at least 1, $g$ is an integer of at least 4, the subscripts $h$, $m$ and $n$ are zero or integers varying from 1 to 200, no more than two of said subscripts $h$, $m$, and $n$ being zero simultaneously, and either or both of $m$ and $n$ being greater than zero, said copolymer having at least 40 weight percent fluorine and at least one glass transition temperature below —100° C., at least 5 weight percent of said copolymer being the moiety

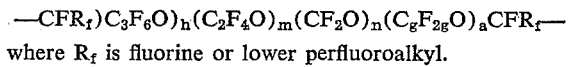

where R$_f$ is fluorine or lower perfluoroalkyl.

8. A block copolymer comprising at least one block comprising that derived from at least one free radical-polymerizable fluorinated olefin having 2–4 carbon atoms and at least one block comprising poly(perfluoroalkylene oxide), said copolymer having at least one glass transition temperature below —78° C.

9. A process for the preparation of a block copolymer, said process comprising the steps of
(a) contacting a solution comprising a solvent and a diacyl halide-terminated poly(perfluoroalkylene oxide) of the formula

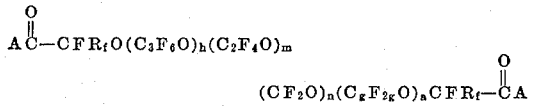

with an alkali or alkaline earth metal peroxide at a temperature and for a time sufficient to form the diacyl peroxide of the formula

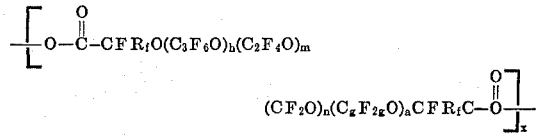

(b) contacting an olefin of the formula R$_1$R$_2$C=CR$_3$R$_4$ with said diacyl peroxide at a temperature and for a time sufficient to polymerize said olefin,
wherein R$_f$ is fluorine or perfluoromethyl, $a$ is zero or 1, $g$ is an integer of at least 4, the subscripts $h$, $m$, and $n$ are zero or integers from 1 to 200, no more than two of said subscripts being zero simultaneously and either or both of $m$ and $n$ being greater than zero, $x$ is the degree of polymerization, R$_1$ and R$_2$ are hydrogen or fluorine, R$_3$ is fluorine, hydrogen, or lower perfluoroalkyl, R$_4$ is fluorine, chlorine, alkyl, perfluoroalkoxy or perfluoroalkyl, and A is chlorine, bromine or fluorine.

10. A process for the preparation of a block copolymer, which comprises polymerizing one or a mixture of free radical polymerizable fluorinated olefins having 2 to 3 carbon atoms and containing not more than 2 hydrogen atoms in the presence of an amount of poly(perfluoroalkylene oxide) polyperoxide sufficient to initiate the free radical polymerization of said fluorinated olefins and incorporate into said block copolymer at least 5 percent by weight of poly(perfluoroalkylene oxide), the latter having a plurality of —CF$_2$O—, —C$_2$F$_4$O—, or —C$_3$F$_6$O—, or mixtures thereof.

11. The process of claim 10 wherein said fluorinated olefins are a mixture of 95 to 50 moles vinylidene fluoride and 5 to 50 moles of perfluoropropene, and the block copolymer contains at least 10 weight percent of said poly-(perfluoroalkylene oxide) blocks, at least 40 weight percent fluorine, and at least one glass transition temperature below —78° C.

12. The process according to claim 10 wherein said polyperoxide consists essentially of the formula

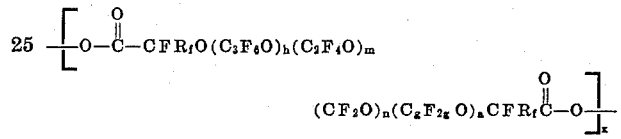

wherein R$_f$ is fluorine or perfluoromethyl, $a$ is zero or 1, $g$ is an integer of at least 4, the subscripts $h$, $m$, and $n$ are zero or integers from 1 to 200, no more than two of said subscripts being zero simultaneously and either or both of $m$ and $n$ being greater than zero, and $x$ is the degree of polymerization.

13. The process according to claim 10 wherein said polyperoxide has the formula

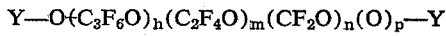

where $h$, $m$, and $n$ are zero or integers varying from 1 to 200, no more than two of said subscripts $h$, $m$ and $n$ being zero simultaneously and either or both of $m$ and $n$ being greater than zero, $p$ is an integer less than the sum of $h+m+n$, the ratio $p/(h+m+n)$ being less than 0.5, and Y is —CF$_3$, —COF, —CF$_2$COF or —CF(CF$_3$)COF.

14. A process for the preparation of a block copolymer, said process comprising the steps of
(a) contacting a solution comprising a solvent and a diacyl halide-terminated poly(perfluoroalkylene oxide) of the formula

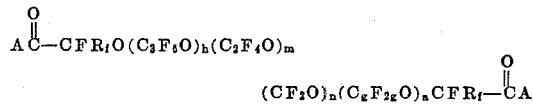

with an aqueous solution of an alkali or alkaline earth metal peroxide at a temperature of —5° C. to 15° C. and for a time sufficient to form the diacyl peroxide of the formula

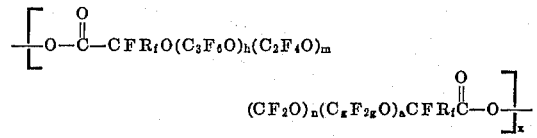

(b) contacting an olefin of the formula R$_1$R$_2$C=CR$_3$R$_4$ with said diacyl peroxide at a temperature of 0° to 50° C. for a time sufficient to polymerize said olefin, wherein R$_f$ is fluorine or perfluoromethyl, $a$ is zero or 1, $g$ is an integer of at least 4, the subscripts $h$, $m$, and $n$ are zero or integers from 1 to 200, no more than two of said subscripts being zero simultaneously and either or both of $m$ and $n$ being greater than zero, $x$ is the degree of polymerization, R$_1$ and R$_2$ are hydrogen or fluorine, R$_3$ is fluorine or lower perfluoroalkyl, R$_4$ is fluorine, chlorine, or lower perfluoroalkyl, and A is chlorine, bromine or fluorine, the amount of said diacyl peroxide used being sufficient to incorporate into said block copolymer at least 10 percent by weight of said $$-CFR_fO(C_3F_6O)_h(C_2F_4O)_m(CF_2O)_n(C_gF_{2g}O)_aCFR_f-.$$

15. A process for the preparation of a block copolymer, which comprises polymerizing one or a mixture of terminally ethylenically unsaturated monomers comprising free radical polymerizable fluorinated olefins having 2–4 carbon atoms in the presence of an amount of poly(perfluoroalkylene oxide) polyperoxide sufficient to initiate the free radical polymerization of said monomers and incorporate into said block copolymer at least 5 percent by weight of poly(perfluoroalkylene oxide).

16. A process according to claim 15, wherein said ethylenically unsaturated monomers are vinylidene fluoride and perfluoropropene.

17. A process for the preparation of a block copolymer, which comprises polymerizing one or a mixture of terminally ethylenically unsaturated monomers comprising free radical polymerizable fluorinated olefin having 2–4 carbon atoms in the presence of an amount of a polyperoxide having the formula $$Y-O(C_3F_6O)_h(C_2F_4O)_m(CF_2O)_n(O)_p-Y$$

where
  $h$, $m$, and $n$ are zero or integers varying from 1 to 200, no more than two of said subscripts $h$, $m$, and $n$ being zero simultaneously and either or both of $m$ and $n$ being greater than zero, $p$ is an integer less than the sum of $h+m+n$, the ratio $p/(h+m+n)$ being less than 0.5, and Y is $-CF_3$, $-COF$, $-CF_2COF$ or $-CF(CF_3)COF$, sufficient to initiate the free radical polymerization of said monomers and incorporate at least 5 percent by weight of poly(perfluoroalkylene oxide) in said block copolymer.

18. The process according to claim 17, wherein said monomers are vinylidene fluoride and perfluoropropene.

References Cited
UNITED STATES PATENTS

| | | | |
|---|---|---|---|
| 3,274,295 | 9/1966 | Baker | 260—879 |
| 3,442,942 | 5/1969 | Sianesi et al. | 260—544 |

MURRAY TILLMAN, Primary Examiner

J. ZIEGLER, Assistant Examiner

U.S. Cl. X.R.

260—874, 887, 890, 898, 900, 901

UNITED STATES PATENT OFFICE
CERTIFICATE OF CORRECTION

Patent No. 3,810,875     Dated May 14, 1974

Inventor(s) David E. Rice and Robert L. Hansen

It is certified that error appears in the above-identified patent and that said Letters Patent are hereby corrected as shown below:

Column 1, line 62, " $\left[CR_1R_2-\right.$ " should read -- $\left[(CR_1R_2-\right.$ --

Column 2, line 55, "fluoroleastomer" should read -- fluoroelastomer --;

Column 3, line 3, " $(CF_2O(_n$ " should read -- $(CF_2O)_n$ --;

Column 3, line 4, " $\left[(CR_1R_2-CR_3R_4)_{t'}\right]_{aj}$ " should read -- $\left[(CR_1R_2-CR_3R_4)_{j'}\right]_{a'}$ --;

Column 3, line 37, " $CFR_1-\overset{O}{\overset{\|}{C}}Cl$ " should read -- $CFR_f-\overset{O}{\overset{\|}{C}}Cl$ --;

Column 3, line 43, " $-CFR_1C$ " should read -- $-CFR_fO$ --;

Column 3, line 46, " $(C_gF_{2g}O)_f$ " should read -- $(C_gF_{2g}O)_a$ --;

Column 3, line 47, " (VII) " should read -- (VI) --;

Column 5, line 7, " (p/(h + m + n) " should read -- p/(h + m + n) --;

Column 6, line 43, "Formula VII" should read -- Formula VI --;

Column 6, line 52, "vinyliene" should read -- vinylidene --;

Column 6, line 69, "heaxfluoropropene" should read -- hexafluoropropene --;

UNITED STATES PATENT OFFICE
CERTIFICATE OF CORRECTION

Patent No. 3,810,875  Dated May 14, 1974

Inventor(s) David E. Rice and Robert L. Hansen

It is certified that error appears in the above-identified patent and that said Letters Patent are hereby corrected as shown below:

Column 9, line 25, " $-CFR_f(C_3F_6O)_h$ " should read -- $-CFR_fO(C_3F_6O)_h$ --;

Column 8, line 61, " $-[CF_1R_2-$ " should read -- $-[(CR_1R_2-$ --;

Column 8, line 70, " $(R_1R_2-CR_3R_4)_j,$ " should read -- $(CR_1R_2-CR_3R_4)_j,$ --;

Column 9, line 41, " $-CFR_f)C_3F_6O)_h$ " should read -- $-CFR_fO(C_3F_6O)_h$ --;

Column 9, line 65, " $\begin{matrix} O \\ \| \\ C-O \end{matrix}]_x$ " should read -- $\begin{matrix} O \\ \| \\ C-O \end{matrix}]_x$ --;

Column 9, line 67, " $R_1R_2=CR_3R_4$ " should read -- $R_1R_2C=CR_3R_4$ --;

Column 10, line 2, "chlorine, alkyl, perfluoroalkoxy" should read -- chlorine, perfluoroalkoxy --;

Column 1, between lines 4 and 5, insert -- assignors to Minnesota Mining and Manufacturing Company, St. Paul, Minn. --.

Signed and Sealed this

*thirtieth* Day of *March 1976*

[SEAL]

Attest:

RUTH C. MASON  
*Attesting Officer*

C. MARSHALL DANN  
*Commissioner of Patents and Trademarks*